United States Patent
Ma et al.

(10) Patent No.: US 10,706,512 B2
(45) Date of Patent: Jul. 7, 2020

(54) PRESERVING COLOR IN IMAGE BRIGHTNESS ADJUSTMENT FOR EXPOSURE FUSION

(71) Applicant: ADOBE INC., San Jose, CA (US)

(72) Inventors: Yinglan Ma, Stanford, CA (US); Sylvain Philippe Paris, Jamaica Plain, MA (US); Chih-Yao Hsieh, San Jose, CA (US)

(73) Assignee: ADOBE INC., San Jose, CA (US)

( * ) Notice: Subject to any disclaimer, the term of this patent is extended or adjusted under 35 U.S.C. 154(b) by 219 days.

(21) Appl. No.: 15/452,112

(22) Filed: Mar. 7, 2017

(65) Prior Publication Data

US 2018/0260941 A1   Sep. 13, 2018

(51) Int. Cl.

| | |
|---|---|
| *G06K 9/40* | (2006.01) |
| *G06T 5/00* | (2006.01) |
| *G06T 5/50* | (2006.01) |
| *H04N 5/232* | (2006.01) |
| *H04N 5/235* | (2006.01) |
| *H04N 9/64* | (2006.01) |

(Continued)

(52) U.S. Cl.
CPC ............ *G06T 5/009* (2013.01); *G06T 5/50* (2013.01); *H04N 5/2356* (2013.01); *H04N 5/23216* (2013.01); *H04N 5/23293* (2013.01); *G06T 2200/24* (2013.01); *G06T 2207/10024* (2013.01); *G06T 2207/10144* (2013.01); *G06T 2207/20208* (2013.01); *G06T 2207/20221* (2013.01); *H04N 9/045* (2013.01); *H04N 9/646* (2013.01); *H04N 9/76* (2013.01)

(58) Field of Classification Search
CPC .......... G06T 2207/20221; G06T 2207/20212; H04N 5/2352; H04N 5/23212; H04N 5/2354; H04N 5/35536; H04N 9/3164; H04N 9/77
See application file for complete search history.

(56) References Cited

U.S. PATENT DOCUMENTS

| | | | | |
|---|---|---|---|---|
| 5,309,243 A | * | 5/1994 | Tsai ..................... | H04N 1/4072 |
| | | | | 348/221.1 |
| 5,712,682 A | * | 1/1998 | Hannah .................... | H04N 5/20 |
| | | | | 348/222.1 |

(Continued)

FOREIGN PATENT DOCUMENTS

| | | | | |
|---|---|---|---|---|
| JP | 2003196649 | * | 7/2003 | ............... G06T 1/00 |

OTHER PUBLICATIONS

A fusion based—images, Xueyang Fu et al., Elsevier, 0165-1684, 2016, pp. 82-96 (Year: 2016).*

*Primary Examiner* — Jayesh A Patel
(74) *Attorney, Agent, or Firm* — Shook, Hardy & Bacon L.L.P.

(57) ABSTRACT

Methods and systems are provided for adjusting the brightness of images. In some implementations, an exposure bracketed set of input images produced by a camera is received. A brightness adjustment is determined for at least one input image from the set of input images. The determined brightness adjustment is applied to the input image. An output image is produced by exposure fusion from the set of input images, using the input image having the determined brightness adjustment. The output image is transmitted where, the transmitting causes display of the output image on a user device.

20 Claims, 6 Drawing Sheets

(51) Int. Cl.
*H04N 9/04* (2006.01)
*H04N 9/76* (2006.01)

(56) References Cited

U.S. PATENT DOCUMENTS

| | | | | | |
|---|---|---|---|---|---|
| 5,801,773 | A * | 9/1998 | Ikeda | ................... | H04N 5/20 348/229.1 |
| 6,204,881 | B1 * | 3/2001 | Ikeda | ................... | H04N 5/20 348/229.1 |
| 6,687,400 | B1 * | 2/2004 | Szeliski | ................ | H04N 5/235 348/E5.034 |
| 6,827,577 | B1 * | 12/2004 | Fulbrook | ............. | G09B 9/307 359/410 |
| 7,428,011 | B1 * | 9/2008 | Hyodo | ............... | H04N 1/00278 348/231.6 |
| 7,557,858 | B2 * | 7/2009 | Honda | .................. | H04N 5/232 348/362 |
| 8,644,702 | B1 * | 2/2014 | Kalajan | ............ | H04N 21/64784 396/429 |
| 8,760,537 | B2 * | 6/2014 | Johnson | ................... | G06T 5/50 348/229.1 |
| 8,842,130 | B1 * | 9/2014 | Blank | ................. | G06F 16/5838 345/593 |
| 9,218,662 | B1 * | 12/2015 | Feder | ......................... | G06T 5/00 |
| 9,357,139 | B2 * | 5/2016 | Tatsumi | ............. | H04N 5/2355 |
| 9,544,505 | B2 * | 1/2017 | Tsuzuki | ............ | H04N 5/23254 |
| 9,544,506 | B1 * | 1/2017 | Wang | ................ | H04N 5/2355 |
| 10,108,314 | B2 * | 10/2018 | Zhai | ....................... | G06T 5/007 |
| 2003/0067551 | A1 * | 4/2003 | Venturino | .......... | H04N 5/23293 348/364 |
| 2003/0133019 | A1 * | 7/2003 | Higurashi | ............ | G06T 3/0081 348/218.1 |
| 2004/0218830 | A1 * | 11/2004 | Kang | ..................... | G06T 5/50 382/274 |
| 2005/0216841 | A1 * | 9/2005 | Acker | ................. | G06F 3/04845 715/730 |
| 2006/0170707 | A1 * | 8/2006 | Kokemohr | .......... | G06F 3/04845 345/629 |
| 2006/0239579 | A1 * | 10/2006 | Ritter | ..................... | G06T 5/50 382/274 |
| 2008/0069551 | A1 * | 3/2008 | Wakamatsu | ........... | G03B 17/00 396/55 |
| 2008/0131007 | A1 * | 6/2008 | Kutka | ................... | H04N 5/235 382/232 |
| 2008/0181597 | A1 * | 7/2008 | Tamura | ................. | G03B 15/05 396/164 |
| 2008/0235310 | A1 * | 9/2008 | Hamada | .............. | G06K 9/6203 708/201 |
| 2009/0027545 | A1 * | 1/2009 | Yeo | ......................... | G06T 5/009 348/362 |
| 2009/0080791 | A1 * | 3/2009 | Chen | ..................... | H04N 5/235 382/266 |
| 2009/0174786 | A1 * | 7/2009 | Joseph | ................... | H04N 5/232 348/222.1 |
| 2009/0231469 | A1 * | 9/2009 | Kato | ..................... | H04N 5/235 348/234 |
| 2009/0304279 | A1 * | 12/2009 | Mori | ..................... | G06T 5/009 382/169 |
| 2009/0322899 | A1 * | 12/2009 | Chan | ..................... | H04N 5/232 348/222.1 |
| 2010/0110180 | A1 * | 5/2010 | Tonogai | ................... | G06T 5/50 348/136 |
| 2011/0032373 | A1 * | 2/2011 | Forutanpour | ........ | G11B 27/034 348/222.1 |
| 2011/0050946 | A1 * | 3/2011 | Lee | ........................ | G03B 9/40 348/222.1 |
| 2011/0176039 | A1 * | 7/2011 | Lo | ....................... | H04N 5/23216 348/294 |
| 2011/0211732 | A1 * | 9/2011 | Rapaport | .............. | G06F 3/1454 382/107 |
| 2011/0222793 | A1 * | 9/2011 | Ueda | ................... | H04N 5/2355 382/284 |
| 2011/0228295 | A1 * | 9/2011 | Doida | ...................... | G06T 5/50 358/1.9 |
| 2012/0002082 | A1 * | 1/2012 | Johnson | ................... | G06T 5/50 348/234 |
| 2012/0019686 | A1 * | 1/2012 | Manabe | .................. | G06T 5/009 348/222.1 |
| 2012/0133793 | A1 * | 5/2012 | Inaba | ..................... | H04N 5/235 348/229.1 |
| 2012/0162366 | A1 * | 6/2012 | Ninan | .................. | H04N 13/289 348/43 |
| 2013/0076937 | A1 * | 3/2013 | Tajima | ................. | H04N 5/2355 348/223.1 |
| 2013/0329092 | A1 * | 12/2013 | Wong | ................... | H04N 5/2356 348/241 |
| 2014/0161348 | A1 * | 6/2014 | Sutherland | ........... | G06K 9/6201 382/162 |
| 2014/0176745 | A1 * | 6/2014 | Pajak | ...................... | H04N 5/225 348/211.99 |
| 2014/0307117 | A1 * | 10/2014 | Feng | .................... | H04N 5/2355 348/218.1 |
| 2014/0347532 | A1 * | 11/2014 | Kang | ..................... | H04N 5/351 348/294 |
| 2015/0109303 | A1 * | 4/2015 | Boyadzhiev | ............. | G06T 5/50 345/426 |
| 2015/0237247 | A1 * | 8/2015 | Hara | ................... | H04N 5/2353 348/362 |
| 2015/0281540 | A1 * | 10/2015 | Matsuoka | ........... | H04N 5/2355 348/362 |
| 2015/0341537 | A1 * | 11/2015 | Peng | ..................... | H04N 5/235 348/234 |
| 2016/0125575 | A1 * | 5/2016 | Takahashi | ................ | G06T 5/50 382/275 |
| 2016/0139774 | A1 * | 5/2016 | Rivard | ............... | G06F 3/04842 715/781 |
| 2016/0379094 | A1 * | 12/2016 | Mittal | ...................... | G06K 9/66 382/224 |
| 2017/0208234 | A1 * | 7/2017 | Wang | .................. | H04N 5/2258 |
| 2018/0246521 | A1 * | 8/2018 | Seo | ...................... | H04N 5/2356 |

* cited by examiner

PRESERVING COLOR IN IMAGE BRIGHTNESS ADJUSTMENT FOR EXPOSURE FUSION

BACKGROUND

In image processing, exposure fusion combines multiple exposures of the same scene into an output image. The multiple exposures can collectively capture the scene with a higher dynamic range than a camera is capable of capturing with a single exposure. This allows a higher quality output image which can use pixels from the various input images while avoiding those that are overexposed and underexposed. In some instances, a user may wish to edit the output image, such as to increase or decrease the brightness of the output image. Various conventional brightness adjustment algorithms could be applied to the output image to accomplish this task.

Adjusting image brightness of an output image from exposure fusion will often result in color distortion in the adjusted image. For example, many brightness adjustment algorithms assume a linear relationship between pixel color values of an image and sensor data. This linear relationship is disrupted by exposure fusion because color values of the output image are determined from multiple exposures. Thus, when adjusting an output image from exposure fusion, some pixel color values may quickly exceed their cutoff value (maximum or minimum value), resulting in color distortion. Complex algorithms could attempt to account for the non-linearity of the pixel color values. However, these algorithms are processor intensive and would still amplify any color distortion that may already exist in the output image.

SUMMARY

Aspects of the present disclosure provide for preserving color in image brightness adjustment for exposure fusion. In some respects, a brightness adjustment is determined for at least one input image of a set of input images. The set of input images are captured over a range of exposure levels (e.g., exposure bracketed) and represent a common scene. The determined brightness adjustment is applied to the input image and the set of input images are combined using exposure fusion into an output image that has a lower proportion of overexposed and underexposed pixels than each input image. By applying the brightness adjustment to the input images, the exposure fusion can produce a brighter output image while preserving color quality because pixel color information is available from each input image for the output image.

In some respects, the input images are selected by a user. The brightness adjustment and combining of the input images may be automatically performed in response to the user selection of the input images. This selection may correspond to a user interaction with a camera capture option (e.g., a shutter button). As another example, a user could select pre-captured images from a selection interface. The brightness adjustment in some cases may be predetermined with respect to the user selection and/or may be machine learned. In some approaches, the brightness adjustment is determined based on an analysis of the pixels of one or more of the input images (e.g., a histogram).

In further respects, a user may select a brightness adjustment interface element (e.g., a brightness slider) in association with a displayed output image. In response to the user selection of the brightness adjustment interface element, a brightness adjusted output image generated using exposure fusion as applied to a set of brightness adjusted input images may be presented to the user. In some cases, the exposure fusion is performed in response to the user selection. In other cases, one or more brightness adjusted output images are generated prior to the user selection, and displayed in response to the user selection. For example, each brightness adjusted output image could correspond to a respective brightness level and the displayed output image can be updated using the brightness adjusted output image corresponding to the user selection (e.g., the brightness level corresponding to a slider position).

BRIEF DESCRIPTION OF THE DRAWINGS

The present invention is described in detail below with reference to the attached drawing figures, wherein.

DETAILED DESCRIPTION

Figure 1:
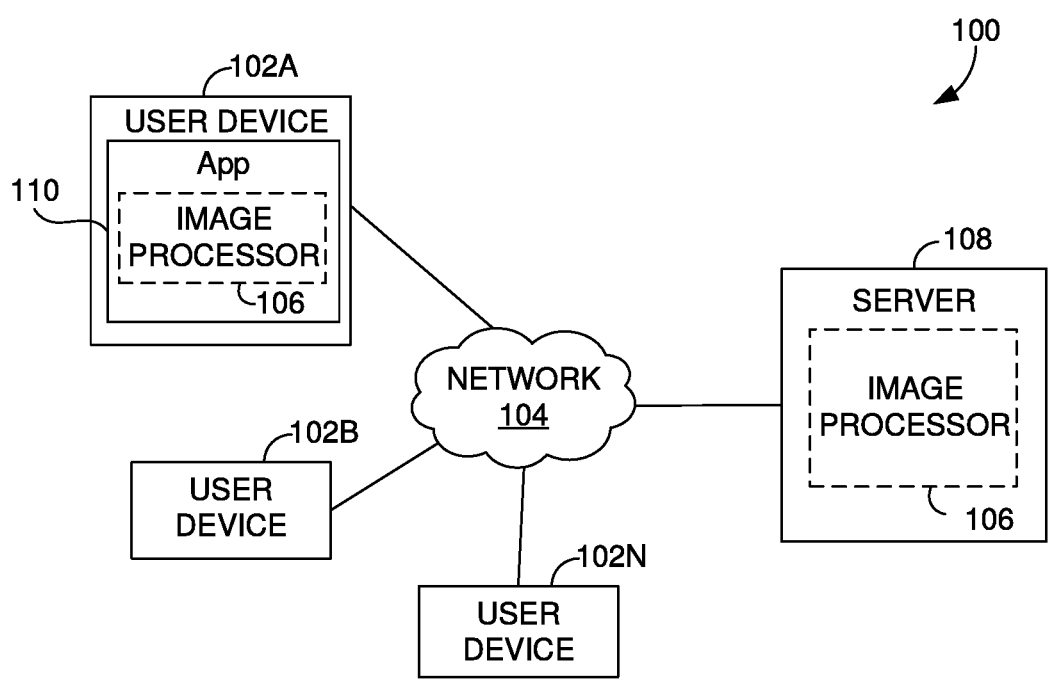
FIG. 1 is a block diagram showing an example of an operating environment, in accordance with embodiments of the present disclosure.

The subject matter of the present invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

At a high level, exposure fusion aims to take the best information from each input image and combine the information into an output image. In some approaches, exposure fusion assigns weights to the pixels of each input image according to various pixel characteristics such as luminosity, saturation, and contrast. Based on weights, the exposure fusion determines whether to include or exclude the pixels from the output image. The input images can represent a common scene captured over a range of exposure levels such that they capture a higher dynamic range than a camera is capable of capturing with a single exposure. For example, a lower exposure input image may have dark undetailed shadows in some regions (comprising underexposed pixels), whereas a higher exposure input image may have extra detail in those regions. In turn, the higher exposure input image may have undetailed overexposed regions (comprising overexposed pixels), whereas the lower exposure input image may have extra detail in those regions. Exposure fusion can use the more detailed regions from each input image for the output image resulting in the output image having a lower proportion of overexposed and underexposed pixels than each input image. The proportion of overexposed and underexposed pixels (e.g., from color value clipping) of an image may be objectively evaluated using any suitable approach, such as based on analyzing the distribution of a histogram of the image.

Implementations of the present disclosure allow for varying the brightness of output images of exposure fusion while preserving color, resulting in higher quality and less distorted output images. A brightness adjustment is determined for at least one input image of a set of input images. The set of input images are captured over a range of exposure levels (e.g., exposure bracketed) and represent a common scene. The determined brightness adjustment is applied to the input image and the set of input images are combined using exposure fusion into an output image that has a lower proportion of overexposed and underexposed pixels than each input image.

By applying the brightness adjustment to the input images, the exposure fusion can produce a brighter output image while preserving color quality because pixel color information is available from each input image for the output image. For example, if the brightness adjustment causes a region of an input image to become overexposed or underexposed and distorted, pixels from less distorted corresponding regions can be incorporated into the output image. Therefore, the output image can be brighter and have reduced color distortion.

In some implementations, the input images are selected by a user. The brightness adjustment and combining of the input images may be automatically performed in response to the user selection of the input images. This selection may correspond to a user interaction with a camera capture option (e.g., a shutter button). As another example, a user could select pre-captured images from a selection interface. The brightness adjustment in some cases may be predetermined with respect to the user selection and/or may be machine learned. In some approaches, the brightness adjustment is determined based on an analysis of the pixels of one or more of the input images (e.g., a histogram).

In further respects, a user may select a brightness adjustment interface element (e.g., a brightness slider) in association with a displayed output image. In response to the user selection of the brightness adjustment interface element, a brightness adjusted output image generated using exposure fusion as applied to a set of brightness adjusted input images may be presented to the user. In some cases, the exposure fusion is performed in response to the user selection. In other cases, one or more brightness adjusted output images are generated prior to the user selection, and displayed in response to the user selection. For example, each brightness adjusted output image could correspond to a respective brightness level and the displayed output image can be updated using the brightness adjusted output image corresponding to the user selection (e.g., the brightness level corresponding to a slider position).

Turning now to FIG. 1, a block diagram is provided showing an example of an operating environment in which some implementations of the present disclosure can be employed. It should be understood that this and other arrangements described herein are set forth only as examples. Other arrangements and elements (e.g., machines, interfaces, functions, orders, and groupings of functions, etc.) can be used in addition to or instead of those shown, and some elements may be omitted altogether for the sake of clarity. Further, many of the elements described herein are functional entities that may be implemented as discrete or distributed components or in conjunction with other components, and in any suitable combination and location. Various functions described herein as being performed by one or more entities may be carried out by hardware, firmware, and/or software. For instance, some functions may be carried out by a processor executing instructions stored in memory.

Among other components not shown, operating environment 100 includes a number of user devices, such as user devices 102A and 102B through 102N, network 104, and server(s) 108.

It should be understood that operating environment 100 shown in FIG. 1 is an example of one suitable operating environment. Each of the components shown in FIG. 1 may be implemented via any type of computing device, such as one or more of computing device 700 described in connection to FIG. 7, for example. These components may communicate with each other via network 104, which may be wired, wireless, or both. Network 104 can include multiple networks, or a network of networks, but is shown in simple form so as not to obscure aspects of the present disclosure. By way of example, network 104 can include one or more wide area networks (WANs), one or more local area networks (LANs), one or more public networks such as the Internet, and/or one or more private networks. Where network 104 includes a wireless telecommunications network, components such as a base station, a communications tower, or even access points (as well as other components) may provide wireless connectivity. Networking environments are commonplace in offices, enterprise-wide computer networks, intranets, and the Internet. Accordingly, network 104 is not described in significant detail.

It should be understood that any number of user devices, servers, and other disclosed components may be employed within operating environment 100 within the scope of the present disclosure. Each may comprise a single device or multiple devices cooperating in a distributed environment.

User devices 102A through 102N comprise any type of computing device capable of being operated by a user. For example, in some implementations, user devices 102A through 102N are the type of computing device described in relation to FIG. 7 herein. By way of example and not limitation, a user device may be embodied as a personal computer (PC), a laptop computer, a mobile device, a smartphone, a tablet computer, a smart watch, a wearable computer, a personal digital assistant (PDA), an MP3 player, a global positioning system (GPS) or device, a video player, a handheld communications device, a gaming device or system, an entertainment system, a vehicle computer system, an embedded system controller, a remote control, an appliance, a consumer electronic device, a workstation, any combination of these delineated devices, or any other suitable device.

The user devices can include one or more processors, and one or more computer-readable media. The computer-readable media may include computer-readable instructions executable by the one or more processors. The instructions may be embodied by one or more applications, such as application 110 shown in FIG. 1. Application 110 is referred to as a single application for simplicity, but its functionality can be embodied by one or more applications in practice. As indicated above, the other user devices can include one or more applications similar to application 110.

The application(s) may generally be any application capable of facilitating and/or performing one or more functions of image processor 106. In some implementations, the application(s) comprises a web application, which can run in a web browser, and could be hosted at least partially on the server-side of operating environment 100 (e.g., on server 108). In addition, or instead, the application(s) can comprise a dedicated application, such as an application having image processing functionality. In some cases, the application is integrated into the operating system (e.g., as a service). It is therefore contemplated herein that "application" be interpreted broadly.

Server 108 also includes one or more processors, and one or more computer-readable media. The computer-readable media includes computer-readable instructions executable by the one or more processors. The instructions may optionally facilitate and/or perform one or more functions of image processor 106.

As indicated in FIG. 1, image processor 106 may in various implementations be integrated into any combination of servers and/or user devices. Image processor 106 can apply a brightness adjustment to one or more images in a set of input images, and combine the adjusted set of input images into an output image that has a lower proportion of overexposed and underexposed pixels than each image in the set of input images.

Figure 2:
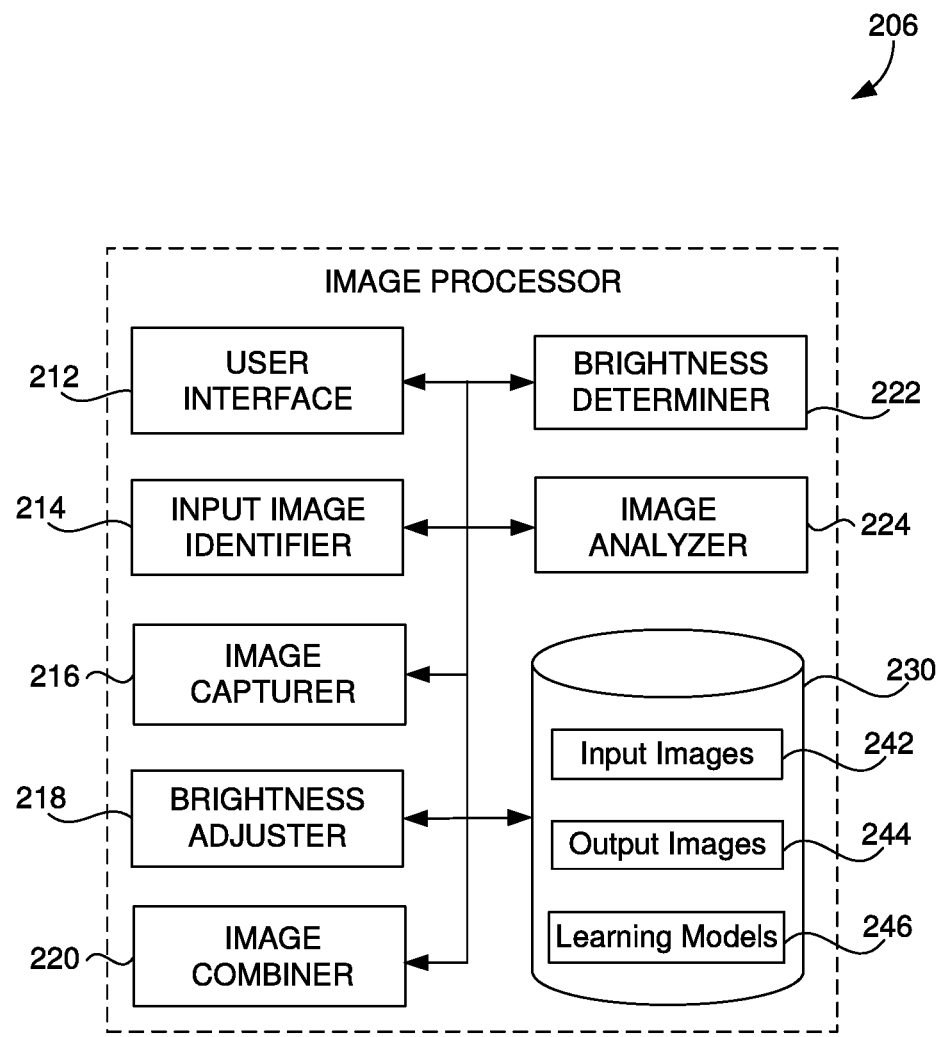
FIG. 2 shows a block diagram of an image processor, in accordance with embodiments of the present disclosure.

Referring to FIG. 2, a block diagram of an image processor is shown, in accordance with embodiments of the present disclosure. Image processor 206, which can correspond to image processor 106, includes user interface 212, input image identifier 214, image capturer 216, brightness adjuster 218, image combiner 220, brightness determiner 222, image analyzer 224, and storage 230.

The foregoing components of image processor 206 can be implemented, for example, in operating environment 100 of FIG. 1. In particular, those components may be integrated into any suitable combination of user devices 102A and 102B through 102N, and server(s) 108. For cloud-based implementations, the instructions on server 108 may implement one or more components of image processor 206, and application 110 may be utilized by a user to interface with the functionality implemented on server(s) 108. In other cases, server 108 may not be required. For example, the components of image processor 206 may be implemented completely on a user device, such as user device 102A. In this case, image processor 206 may be embodied at least partially by the instructions corresponding to application 110.

Thus, it should be appreciated that image processor 206 may be provided via multiple devices arranged in a distributed environment that collectively provide the functionality described herein. Additionally, other components not shown may also be included within the distributed environment. In addition, or instead, image processor 206 can be integrated, at least partially, into a user device, such as user device 102A. Furthermore, image processor 206 may at least partially be embodied as a cloud computing service.

Storage 230 can comprise computer-readable media and is configured to store computer instructions (e.g., software program instructions, routines, or services), data, and/or models used in embodiments described herein. In some implementations, storage 230 stores information or data received via the various components of image processor 206 and provides the various components with access to that information or data, as needed. In implementations, storage 230 comprises a data store (or computer data storage). Although depicted as a single component, storage 230 may be embodied as one or more data stores and may be in the cloud. Further, the information in storage 230 may be distributed in any suitable manner across one or more data stores for storage (which may be hosted externally). Among other potential information, storage 230 includes, as examples, input images 242, output images 244, and learning models 246, which will further be described below.

As an overview, user interface 212 is generally configured to provide an interface between users and image processor 206, such as receiving user inputs and providing an output image and/or other information for display on a user device (e.g., user device 102A). Input image identifier is configured to identify a set of input images for exposure fusion, such as based on user input provided using user interface 212. Image capturer 216 is configured to capture the set of input images, such as in response to the user input to user interface 212. Brightness determiner 222 is configured to determine one or more brightness adjustments to one or more of the images in the set of images identified by input image identifier 214. Brightness determiner 222 may use image analyzer 224 to analyze images in determining the one or more brightness adjustments. Brightness adjuster 218 adjusts the brightness of the one or more input images using the determined one or more brightness adjustments, and image combiner 220 combines the adjusted set of input images into an output image (e.g., using exposure fusion).

As mentioned above, input image identifier is configured to identify a set of input images for exposure fusion. This can include, for example, input images 242. Input images 242 are captured over a range of exposure levels. For example, input images 242 can comprise exposure bracketed images. Exposure bracketing refers to capturing several shots of the same subject or scene using different camera exposure settings. The capturing may be performed automatically by the camera(s), or may be at least partially manually performed. Typically, exposure bracketing involves changing either the shutter speed, the aperture, the ISO speed, the light level (e.g. using artificial light, flash), or combinations thereof from shot to shot. In some cases, the camera determines optimal exposure conditions for a shot and captures the shot along with at least one shot at a higher exposure level and at least one shot at a lower exposure level for a given capture of a subject or scene (e.g., in a sequence in response to a single shutter button selection).

Figure 3:
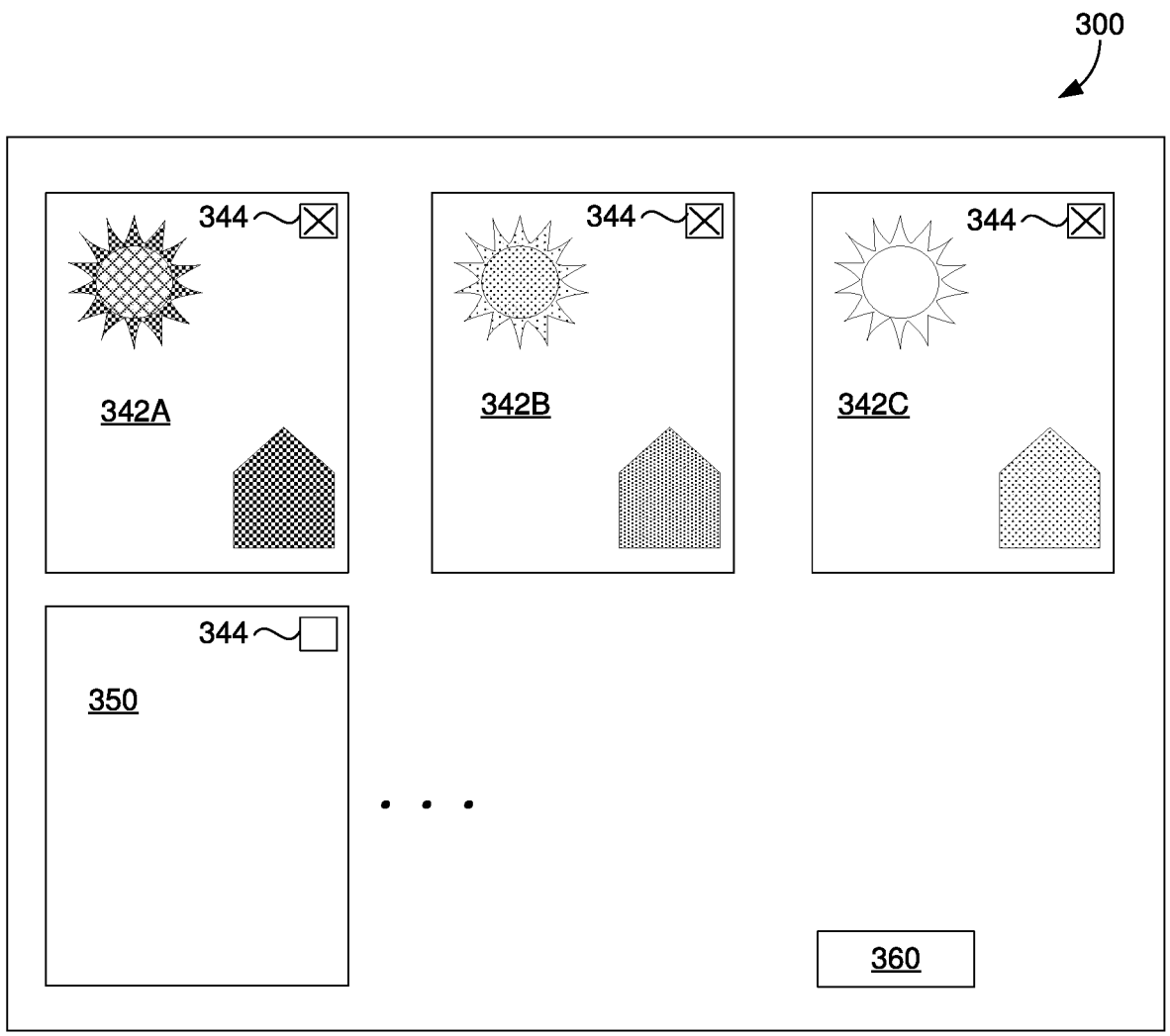
FIG. 3 shows an example of an interface screen, in accordance with embodiments of the present disclosure.

FIG. 3 shows an example of a set of input images in accordance with disclosed embodiments. Input images 342A, 342B, and 342C of FIG. 3 may correspond to input images 242 of FIG. 2. By way of example, input image 242B may have an exposure value (EV) of 0, input image 242A may have an EV of −2, and input image 242C may have an EV of 2. Although three input images are shown, generally the set of input images can include at least two or more input images.

The example of FIG. 3 shows interface screen 300, which may correspond to user interface 212 of FIG. 2. In the example shown, a user can use interface screen 300 to select the set of input images from a larger set of selectable images. In this case, the images are individually selectable via a graphical user interface (GUI) element. The GUI element for each selectable image is checkbox 344, in the present example. As shown, the user has selected input images 342A, 342B, and 342C and refrained from selecting image 350. Interface screen 300 may optionally include an apply button 360 a user can select to confirm the selection of the set of input images. Input image identifier 214 can identify the set of input images based on the user selection of the set of input images input images.

Figures 4A, 4B:
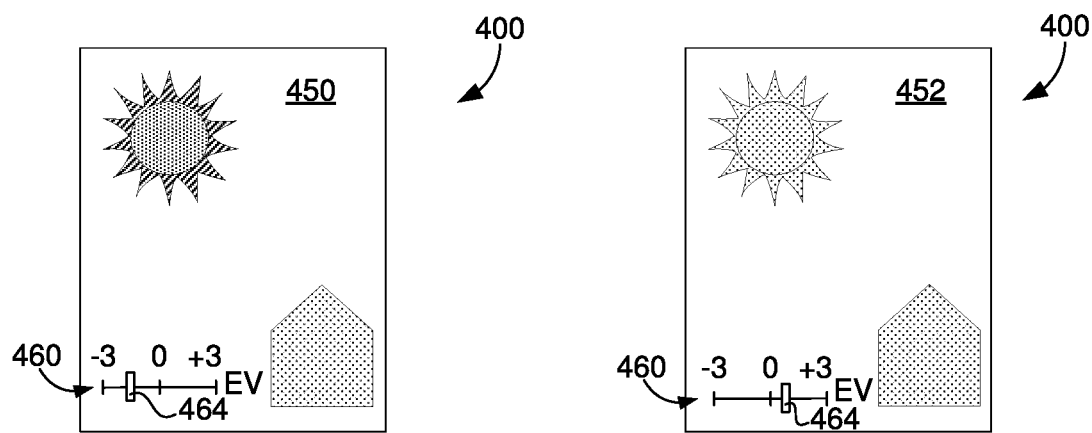
FIG. 4A shows an example of an interface screen, in accordance with embodiments of the present disclosure.
FIG. 4B shows an example of an interface screen, in accordance with embodiments of the present disclosure.

Interface screen 300 provides one example of input image identifier 214 identifying a set of input images for exposure fusion based on a user selecting the set of input images. However, many variations to the approach shown could be employed. For example, as mentioned above, in some cases, the user selection could correspond to a selection of a camera shutter button (e.g., virtual or physical) on a user device. In implementations which include image capturer 216, the selection could trigger image capturer 216 to capture the images (e.g., using bracketing). However, it is noted image capturer 216 is optional image processor 206. As another example, the user selection could correspond to an adjustment to a brightness setting. FIGS. 4A and 4B can be used to illustrate a user selection corresponding to an adjustment to a brightness setting.

FIGS. 4A and 4B show an interface screen in accordance with disclosed embodiments. Interface screen 400 can correspond to user interface 212 of FIG. 2. In FIG. 4A, interface screen 400 displays output image 450 and in FIG. 4B, interface screen 400 displays output image 452. Output images 450 and 452 can correspond to output images 244 of FIG. 2. Interface screen 400 also optionally includes brightness adjustment interface element 460, which a user can use to select a different brightness level for the displayed output image. In the present example, brightness adjustment interface element 460 is a brightness slider element and a user can interact with slider 464 to adjust the brightness setting.

In some implementations, user interactions with brightness adjustment interface element 460 could correspond to a user selection causing image analyzer 224 to identify input images 242 for exposure fusion. In other cases, the exposure fusion may have already been performed on the input images and the user interactions cause an output image produced by the exposure fusion to be presented on the user device.

To illustrate the forgoing, assume a user moves slider 464 from the position shown in FIG. 4A to the position shown in FIG. 4B. This can cause user interface 212 to automatically replace output image 450 with output image 452, as shown in FIG. 4B, such that the currently displayed output image corresponds to the brightness setting of brightness adjustment interface element 460. Image processor 206 may have predetermined one or more of the output images available at the various brightness settings, or one or more may be generated in response to selection of the setting. In some cases, multiple output images are predetermined over a range of brightness levels. Image processor 206 may present those output images when their corresponding brightness setting is selected, and/or may interpolate between one or more of the output images to produce an output image for intermediate brightness levels. In implementations where output images are interpolated, computing resources can be preserved as exposure fusion need not be performed for each brightness level. This may allow for a quick update to the displayed output image when a new setting is selected.

As mentioned above, brightness adjuster 218 adjusts the brightness of the one or more input images using the determined one or more brightness adjustments. The adjustment can be performed in response to the identification of the set input images by input image identifier 214. As indicated above, any number of the input images may have its brightness adjusted. Brightness adjustment algorithms are well known and any suitable algorithm could be employed. As an example, an exposure adjustment may be performed, which can adjust the highlights, midtones and shadows evenly (e.g., linear brightness adjustment). The brightness adjustment can be a full image affect which can analyze each pixel color of the image and may adjust the pixel color accordingly. In some cases, the brightness adjustment could be non-linear and may focus on the midtones and/or fill lights.

As mentioned above, the brightness adjustments can be determined by brightness determiner 222. In some implementations, the brightness adjustments are predetermined, and may be independent from the set of input images. In other cases, brightness determiner 222 cause use image analyzer 224 to analyze one or more of the input images and determined the brightness adjustment based on the analysis. This could include image analyzer 224 generating and analyzing a histogram. For example, brightness determiner 222 may determine the brightness adjustment based on the tonal distribution in one or more of the input images. As an example, based on detecting a relatively low representation of a range of tonal values, brightness determiner 222 could determine to increase the EV of one or more of the input images.

In some cases, the brightness adjustment can be machine learned and provided by learning models 246. Learning models 246 can comprise one or more machine learning models, such as a neural network. A machine learning model employed by brightness determiner 222 may, for example, be trained using supervised learning given sample sets of input images and corresponding output images. In addition or instead, Learning models 246 can comprise a machine learning model configured to determine a particular user's preference for a brightness level and determine the adjustment based on the preferred brightness level. This may be learned, for example, based on user input to brightness adjustment interface element 460.

Image combiner 220 combines the adjusted set of input images into an output image (e.g., using exposure fusion). Each output image generated from a given set of adjusted input images can correspond to one of output images 244. In some approaches, image combiner 220 assigns weights to the pixels of each input image according to various pixel characteristics such as luminosity, saturation, and contrast. Based on weights, image combiner 220 determines whether to include or exclude the pixels from the output image. Due to the brightness adjustment to the set of input images, the weights may be different than had the adjustment been applied. Therefore a different output image will result. For example, if the brightness adjustment improved some portions of an input image and other portions were diminished, image combiner 220 may detect the improved portions and include them in the output image and detect the diminished portions and exclude them from the output image. It is noted, the original set of input images may be retained and one car more of those images may optionally be included in the adjusted set t images along with at least one adjusted image.

An output image generated by image combiner 220 may be presented using user interface 212, such as is shown in FIGS. 4A and 4B. It is noted that while in some cases, image combiner 220 generates an output image from the initial set of input images, in other cases, image combiner 220 may only generate an output mage from an adjusted set of input images. Furthermore, an output image generated from the initial set of input images may or may not be presented or displayed to a user by user interface 212. However, this output image could optionally correspond to a setting with an EV of 0 for brightness adjustment interface element 460, as one example.

Figure 5:
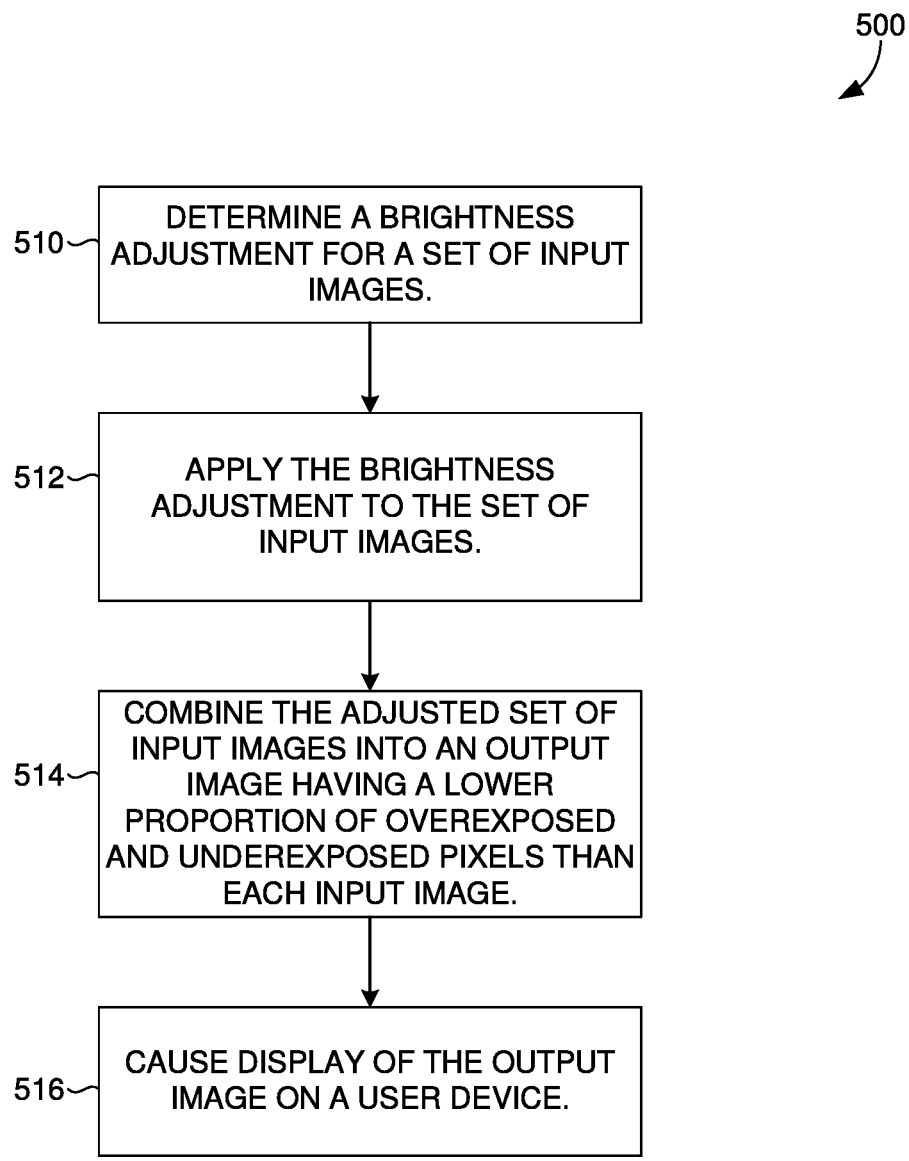
FIG. 5 is a flow diagram showing a method, in accordance with embodiments of the present disclosure.

Referring now to FIG. 5, a flow diagram is provided showing an embodiment of a method 500 in accordance with disclosed embodiments. Each block of method 500 and other methods described herein comprises a computing process that may be performed using any combination of hardware, firmware, and/or software. For instance, various functions may be carried out by a processor executing instructions stored in memory. The methods may also be embodied as computer-usable instructions stored on computer storage media. The methods may be provided by a standalone application, a service or hosted service (standalone or in combination with another hosted service), or a plug-in to another product, to name a few.

At block 510, method 500 includes determining a brightness adjustment for a set of input images. For example, brightness determiner 222 can determine a brightness adjustment for input images 242.

At block 512, method 500 includes applying the brightness adjustment to the set of input images. For example, brightness adjuster 218 can apply the determined brightness adjustment to input images 242.

At block 514, method 500 includes combing the adjusted set of input images into an output image having a lower proportion of overexposed and underexposed pixels than each input image. For example, image combiner 220 can combine the adjusted set of input images 242 into one of output images 244.

At block 516, method 500 includes causing display of the output image on a user device. For example, user interface 212 can transmit the output image for display on the user device. In addition or instead, user interface 212 can cause the output image to be persisted in storage in association with the user. For example, when a user may indicate they are satisfied with the output image, such as by selecting a save option or other interface element. This may cause the output image to be persisted in the storage.

Figure 6:
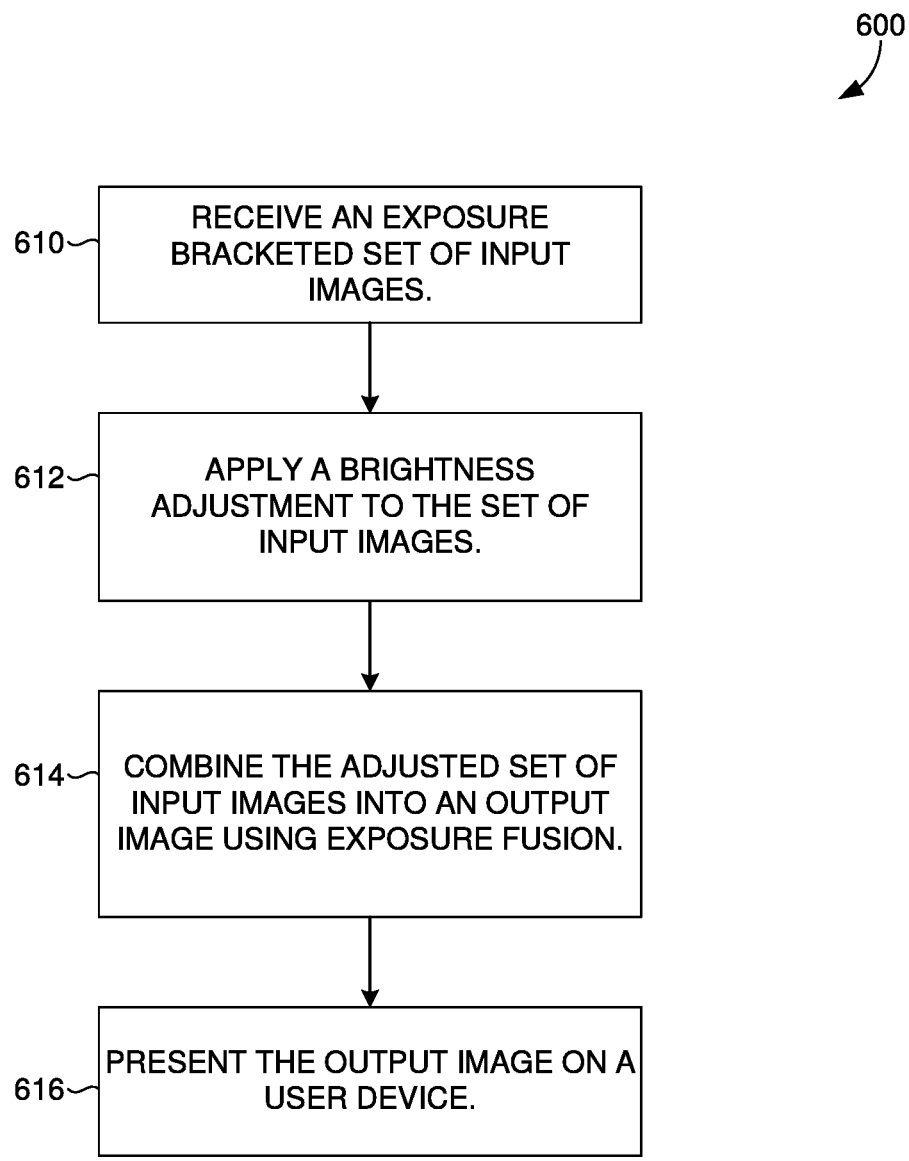
FIG. 6 is a flow diagram showing a method, in accordance with embodiments of the present disclosure.

Referring now to FIG. 6, a flow diagram is provided showing an embodiment of a method 500 in accordance with disclosed embodiments. At block 610, method 600 includes receiving an exposure bracketed set of input images. For example, brightness adjuster 218 can receive input images 342A, 342B, and 342C.

At block 612, method 600 includes applying a brightness adjustment to the set of input images. For example, brightness adjuster 218 can apply a brightness adjustment determined by brightness determiner 222 to one or more of input images 342A, 342B, and 342C.

At block 614, method 600 includes combing the adjusted set of input images into an output image using exposure fusion. For example, image combiner 220 can combine input images 342A, 342B, and 342C as adjusted by brightness adjuster 218 into an output image using exposure fusion. The output image could correspond to output image 450, as an example. Method 600 could also be used to generate output image 452, although the adjusted versions of input images 342A, 342B, and/or 342C would be different than those used to generate output image 450.

At block 616, method 600 includes presenting the output image on a user device. For example, user interface 212 may present output image 452 on a user device (e.g., user device 102A).

Figure 7:
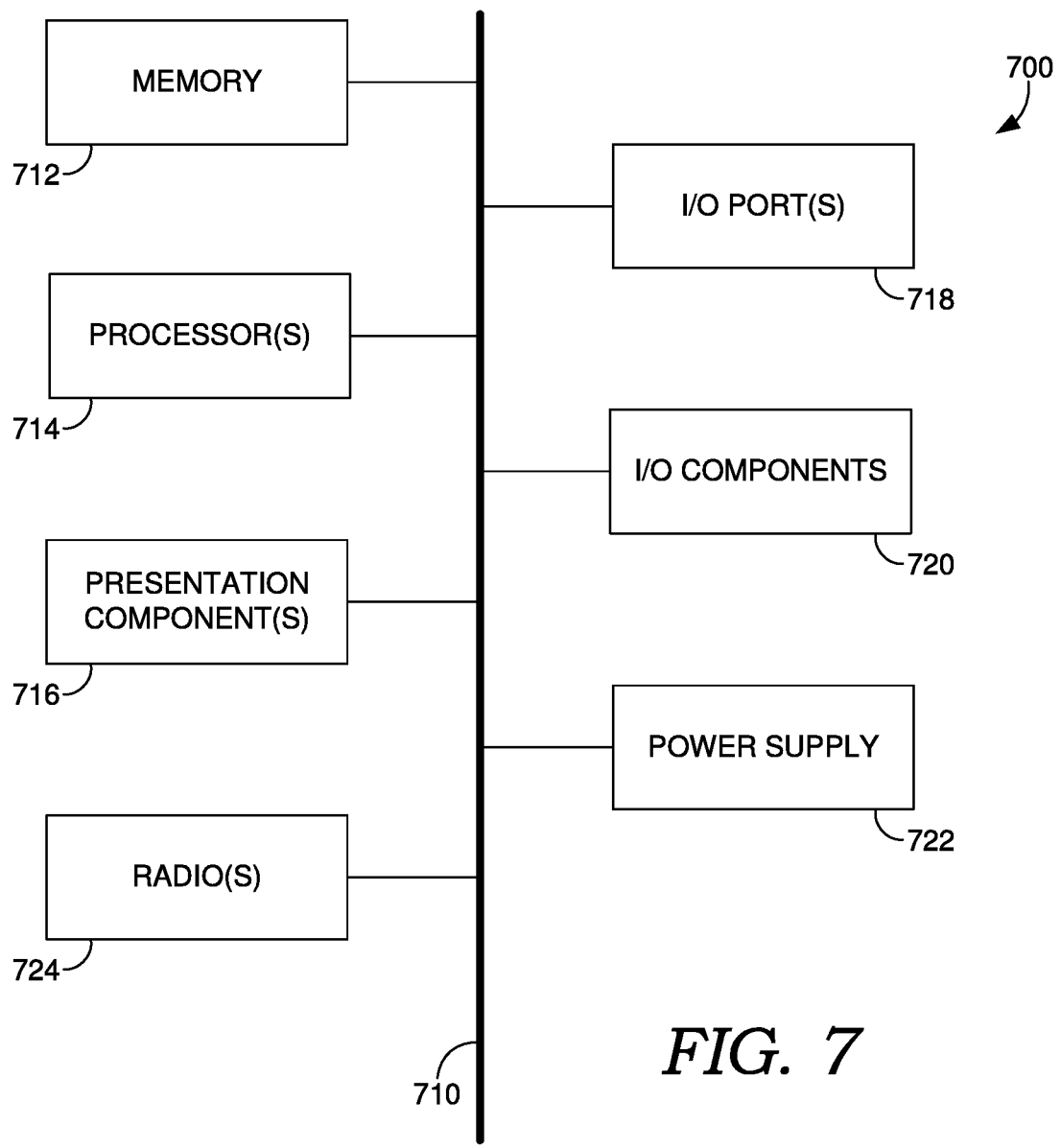
FIG. 7 is a block diagram of an exemplary computing environment suitable for use in implementing embodiments of the present disclosure.

With reference to FIG. 7, computing device 700 includes bus 710 that directly or indirectly couples the following devices: memory 712, one or more processors 714, one or more presentation components 716, input/output (I/O) ports 718, input/output components 720, and illustrative power supply 722. Bus 710 represents what may be one or more busses (such as an address bus, data bus, or combination thereof). Although the various blocks of FIG. 7 are shown with lines for the sake of clarity, in reality, delineating various components is not so clear, and metaphorically, the lines would more accurately be grey and fuzzy. For example, one may consider a presentation component such as a display device to be an I/O component. Also, processors have memory. The inventors recognize that such is the nature of the art and reiterate that the diagram of FIG. 7 is merely illustrative of an exemplary computing device that can be used in connection with one or more embodiments of the present invention. Distinction is not made between such categories as "workstation," "server," "laptop," "handheld device," etc., as all are contemplated within the scope of FIG. 7 and reference to "computing device."

Computing device 700 typically includes a variety of computer-readable media. Computer-readable media can be any available media that can be accessed by computing device 700 and includes both volatile and nonvolatile media, removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile disks (DVDs) or other optical disk storage, magnetic cassettes, magnetic tape, magnetic disk storage or other magnetic storage devices, or any other medium which can be used to store the desired information and which can be accessed by computing device 700. Computer storage media does not comprise signals per se. Communication media typically embodies computer-readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media, such as a wired network or direct-wired connection, and wireless media, such as acoustic, RF, infrared, and other wireless media. Combinations of any of the above should also be included within the scope of computer-readable media.

Memory 712 includes computer storage media in the form of volatile and/or nonvolatile memory. The memory may be removable, non-removable, or a combination thereof. Exemplary hardware devices include solid-state memory, hard drives, optical-disc drives, etc. Computing device 700 includes one or more processors that read data from various entities such as memory 712 or I/O components 720. Presentation component(s) 716 present data indications to a user or other device. Exemplary presentation components include a display device, speaker, printing component, vibrating component, etc.

I/O ports 718 allow computing device 700 to be logically coupled to other devices including I/O components 720, some of which may be built in. Illustrative components include a microphone, joystick, game pad, satellite dish, scanner, printer, wireless device, etc. I/O components 720 may provide a natural user interface (NUI) that processes air gestures, voice, or other physiological inputs generated by a user. In some instances, inputs may be transmitted to an appropriate network element for further processing. An NUI may implement any combination of speech recognition, touch and stylus recognition, facial recognition, biometric recognition, gesture recognition both on screen and adjacent to the screen, air gestures, head and eye tracking, and touch recognition associated with displays on computing device 700. Computing device 700 may be equipped with depth cameras, such as stereoscopic camera systems, infrared camera systems, RGB camera systems, and combinations of these, for gesture detection and recognition. Additionally, computing device 700 may be equipped with accelerometers or gyroscopes that enable detection of motion. The output of the accelerometers or gyroscopes may be provided to the display of computing device 700 to render immersive augmented reality or virtual reality.

The present invention has been described in relation to particular embodiments, which are intended in all respects to be illustrative rather than restrictive. Alternative embodiments will become apparent to those of ordinary skill in the art to which the present invention pertains without departing from its scope.

Many different arrangements of the various components depicted, as well as components not shown, are possible without departing from the scope of the claims below. Embodiments of the present invention have been described with the intent to be illustrative rather than restrictive. Alternative embodiments will become apparent to readers of this disclosure after and because of reading it. Alternative means of implementing the aforementioned can be completed without departing from the scope of the claims below. Certain features and sub-combinations are of utility and may be employed without reference to other features and sub-combinations and are contemplated within the scope of the claims.

What is claimed is:

1. A computer-implemented system for adjusting image brightness, the system comprising:
    a brightness determiner means for determining a brightness adjustment for an initial set of input images representing a common scene captured over a range of exposure levels, the brightness adjustment based at least on a brightness setting corresponding to a first output image formed from the initial set of input images;
    a brightness adjuster means for applying the determined brightness adjustment to the initial set of input images to form an adjusted set of input images, wherein the adjusted set of input images includes at least one image from the initial set of input images having an adjusted brightness;
    an image combiner means for combining the adjusted set of input images to form a second output image; and
    a user interface means for replacing a presentation of the first output image that is a combination of the initial set of input images with the second output image that is a combination of the adjusted set of input images on a user device, the replacing being in response to a user selection of the brightness setting corresponding to the first output image.

2. The system of claim 1, further comprising an image analyzer means for analyzing the initial set of input images for the determining of the brightness adjustment.

3. The system of claim 1, further comprising an input image identifier means for identifying the initial set of input images for the combining, the identification based on the user selection of the brightness setting corresponding to the first output image.

4. The system of claim 1, wherein the image combiner means uses exposure fusion to combine the adjusted set of input images to form the second output image, the second output image having a lower proportion of overexposed and underexposed pixels than the initial set of input images.

5. The system of claim 1, wherein the replacing of the first output image is in response to a user interaction with a brightness adjustment interface element that defines the user selection.

6. The system of claim 1, wherein the adjusted brightness is an adjustment to pixel colors of the at least one image from the initial set of input images.

7. A computer-implemented method for adjusting image brightness, the method comprising:
    receiving an exposure bracketed initial set of input images produced by a camera;
    displaying a first output image that is a combination of the initial set of input images;
    in response to receiving a brightness setting for the first output image, determining a brightness adjustment for the initial set of input images based at least in part on analyzing a tonal distribution of the initial set of input images and the brightness setting;
    applying the determined brightness adjustment to at least one image of the initial set of input images to form an adjusted set of input images;
    producing a second output image by exposure fusion from the adjusted set of input images; and
    transmitting the second output image, the transmitting causing a replacement to the displayed first output image with the second output image on a user device.

8. The method of claim 7, wherein the first output image is produced automatically in response to a user selection of the initial set of input images.

9. The method of claim 7, wherein the first output image is produced automatically in response to a user selection of a camera shutter button, the user selection causing the camera to capture the initial set of input images.

10. The method of claim 7, wherein the transmitting of the second output image causes the second output image to replace the first output image corresponding to the initial set of input images.

11. The method of claim 7, wherein the brightness adjustment is determined by one or more machine learning models.

12. The method of claim 7, wherein the brightness adjustment is based on determining a user preference for a brightness level.

13. The method of claim 7, wherein the determining of the brightness adjustment is based on analyzing pixel colors of the initial set of input images.

14. One or more non-transitory computer-readable media having executable instructions embodied thereon, which, when executed by one or more processors, cause the one or more processors to perform a method for adjusting image brightness, the method comprising:
    receiving an initial set of input images representing a common scene captured over a range of exposure levels;
    displaying a first output image that is a combination of the initial set of input images;
    determining a brightness adjustment for the initial set of input images based at least in part on analyzing visual content of the initial set of the input images and a brightness setting corresponding to the first output image;
    applying the brightness adjustment to at least one image of the initial set of input images to form an adjusted set of input images;

combining the adjusted set of input images resulting from the applying of the brightness adjustment to form a second output image; and presenting the second output image on a user device, the presenting replacing the first output image that is a combination of the initial set of input images with the second output image that is a combination of the adjusted set of input images in response to receiving the brightness setting corresponding to the first output image.

15. The one or more non-transitory computer-readable media of claim 14, wherein the first output image is presented automatically in response to a user selection of the initial set of input images in a user interface.

16. The one or more non-transitory computer-readable media of claim 14, wherein the combination of the initial set of input images to generate the first output image is performed automatically in response to a user selection of a camera shutter button, the user selection causing the camera to capture the initial set of input images.

17. The one or more non-transitory computer-readable media of claim 14, wherein the presenting of the second output image replaces the first output image, the second output image corresponding to a different brightness setting than the first output image, the second output image having a lower proportion of overexposed and underexposed pixels than the initial set of input images used in the combining.

18. The one or more non-transitory computer-readable media of claim 14, wherein the brightness adjustment is determined by one or more machine learning models.

19. The one or more non-transitory computer-readable media of claim 14, wherein the brightness adjustment is based on determining a user preference for a brightness level.

20. The one or more non-transitory computer-readable media of claim 14, further comprising determining the second output image from a plurality of output images for the presenting, each output image generated from the adjusted set of input images at a different respective brightness level, the determining being in response to a user selection of the brightness setting corresponding to the first output image.

* * * * *